(12) United States Patent
Yamada et al.

(10) Patent No.: US 8,432,594 B2
(45) Date of Patent: Apr. 30, 2013

(54) MIRROR ACTUATOR AND BEAM IRRADIATION DEVICE

(75) Inventors: Masato Yamada, Inuyama (JP); Yoichiro Goto, Gifu (JP)

(73) Assignee: Sanyo Electric Co., Ltd., Moriguchi-Shi, Osaka (JP)

( * ) Notice: Subject to any disclaimer, the term of this patent is extended or adjusted under 35 U.S.C. 154(b) by 360 days.

(21) Appl. No.: 12/953,905

(22) Filed: Nov. 24, 2010

(65) Prior Publication Data

US 2011/0128601 A1    Jun. 2, 2011

(30) Foreign Application Priority Data

Nov. 30, 2009  (JP) ................................. 2009-272843
Aug. 20, 2010  (JP) ................................. 2010-185219

(51) Int. Cl.
*G02B 26/08* (2006.01)

(52) U.S. Cl.
USPC .................. 359/200.7; 359/198.1; 359/199.3; 359/200.1

(58) Field of Classification Search .... 359/198.1–200.1, 359/200.7, 221.1–221.3
See application file for complete search history.

(56) References Cited

FOREIGN PATENT DOCUMENTS

JP    2008-281339 A    11/2008

*Primary Examiner* — James Phan
(74) *Attorney, Agent, or Firm* — Ditthavong Mori & Steiner, P.C.

(57) ABSTRACT

A mirror actuator includes a turning axis for turning a mirror; a support section for supporting the turning axis so as to be capable of turning; and a sliding contact member that is arranged on the turning axis and is opposed to the support section in a direction parallel to the turning axis with a predetermined clearance from the support section. The turning axis is biased in one direction parallel to the turning axis. This biasing causes the sliding contact member to contact the support section.

16 Claims, 14 Drawing Sheets

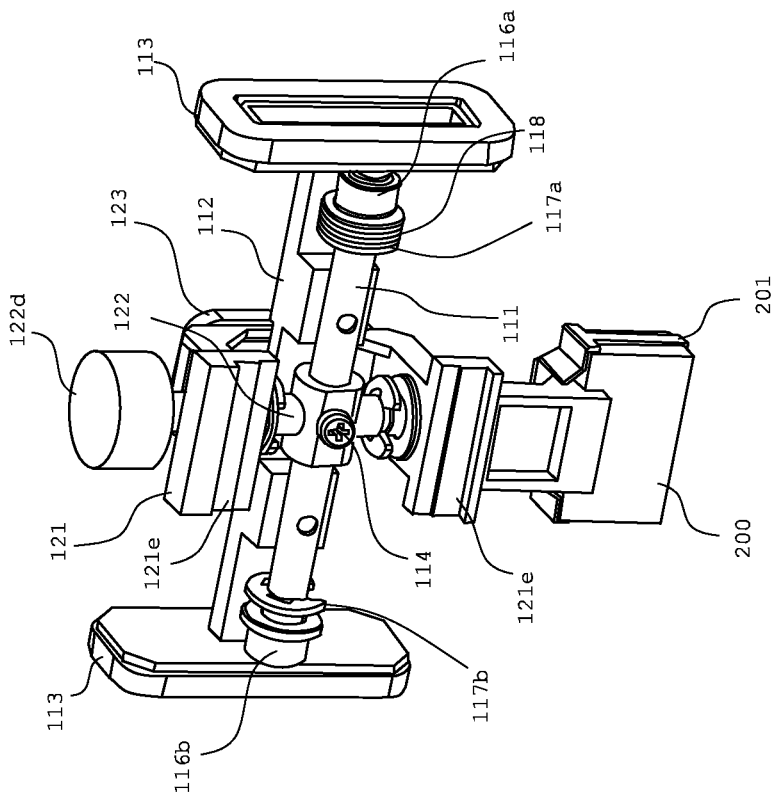
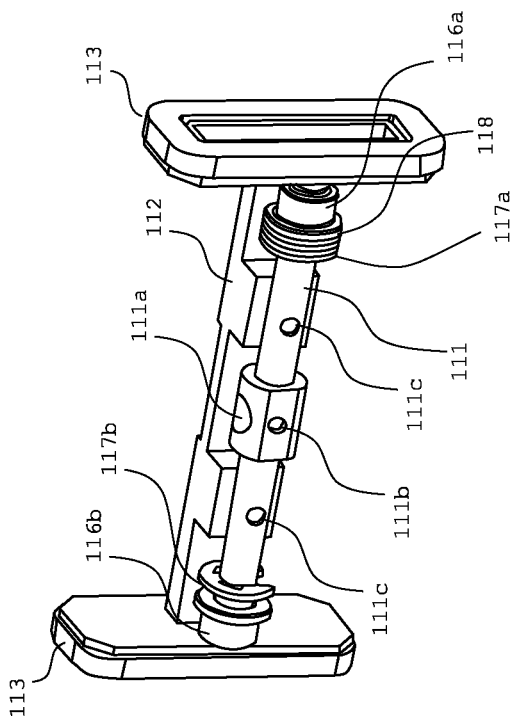
FIG. 2A
FIG. 2B

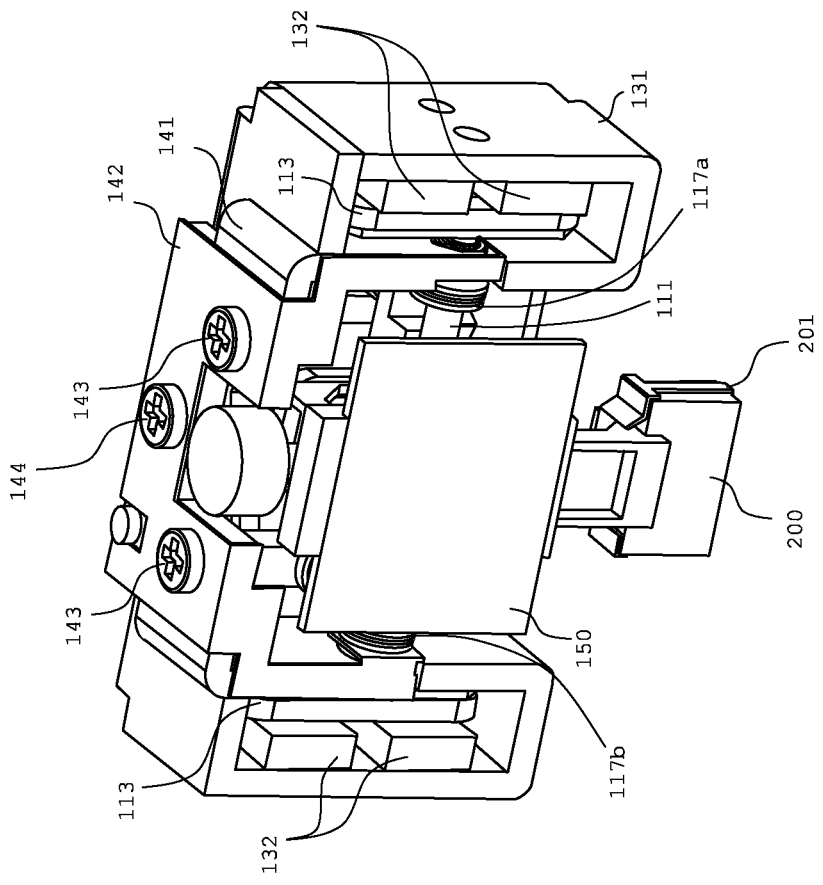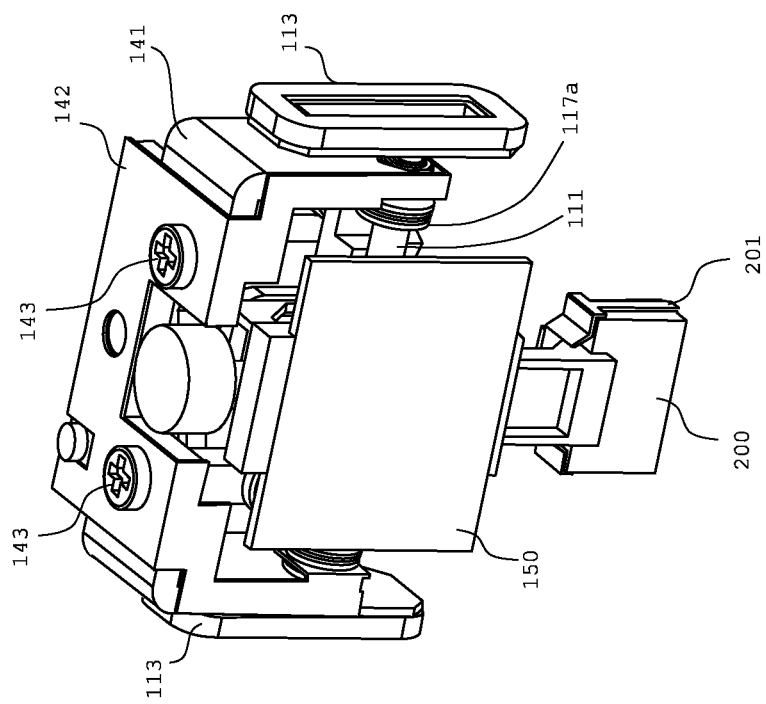

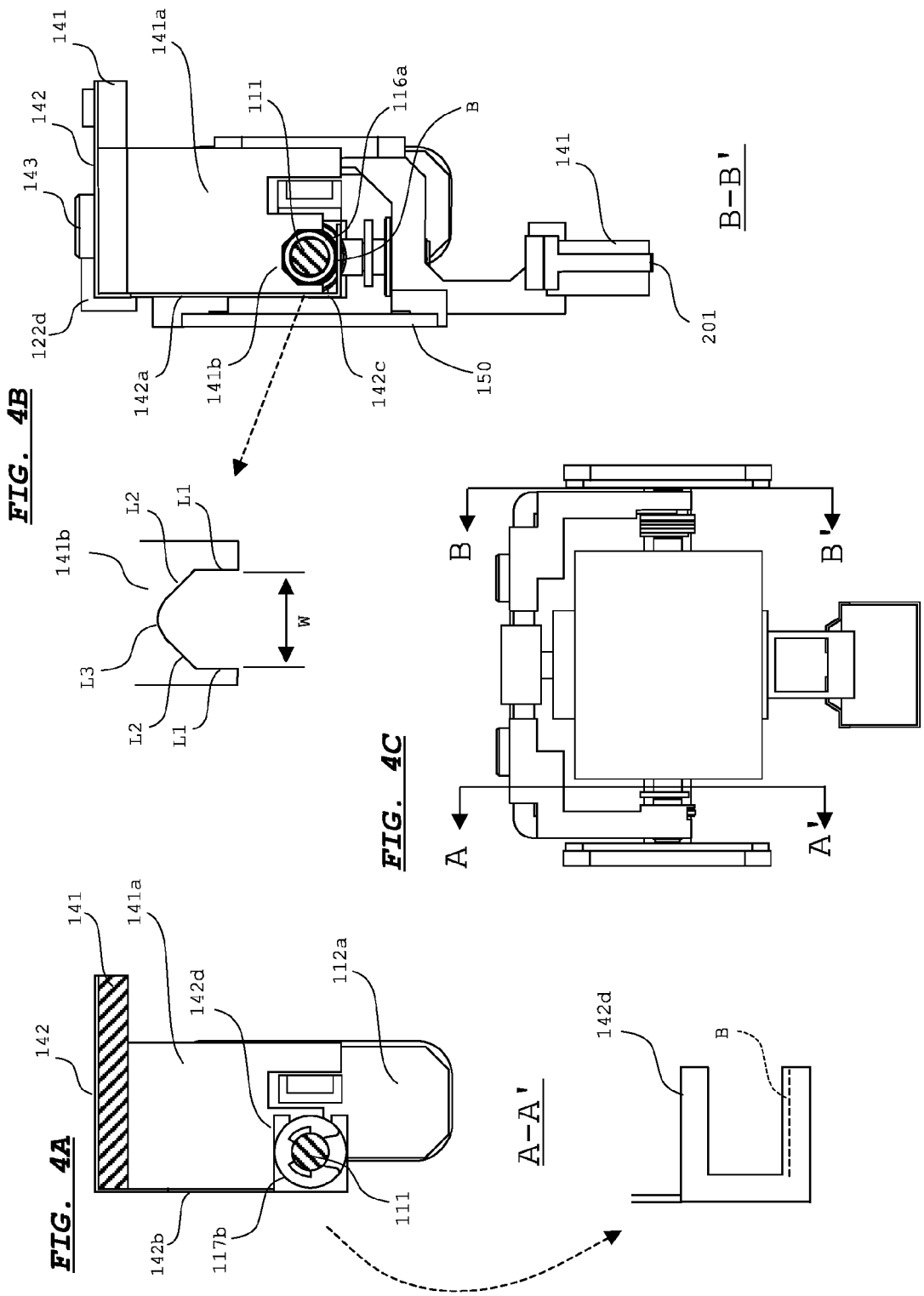

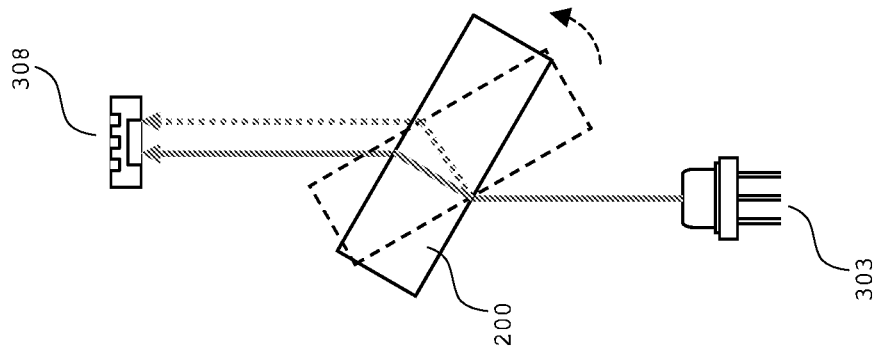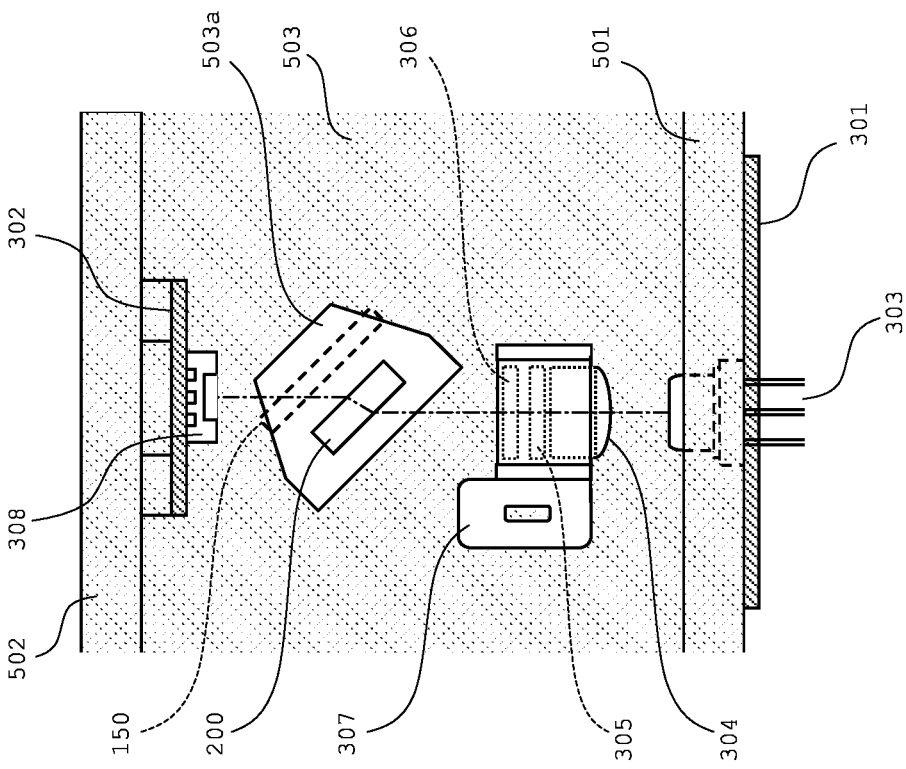

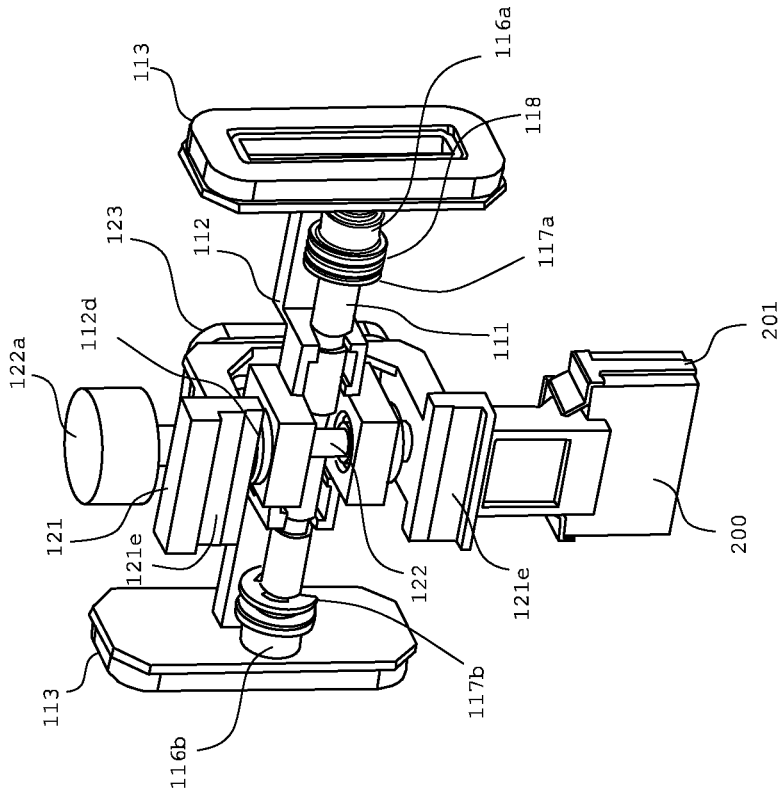
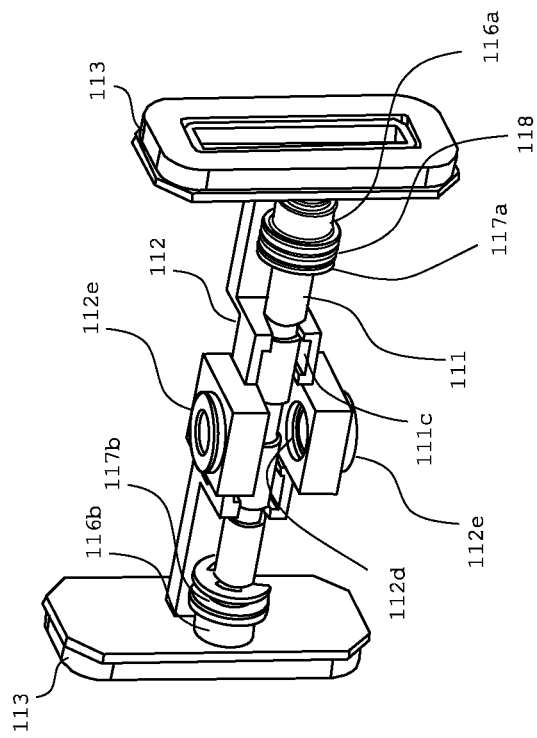

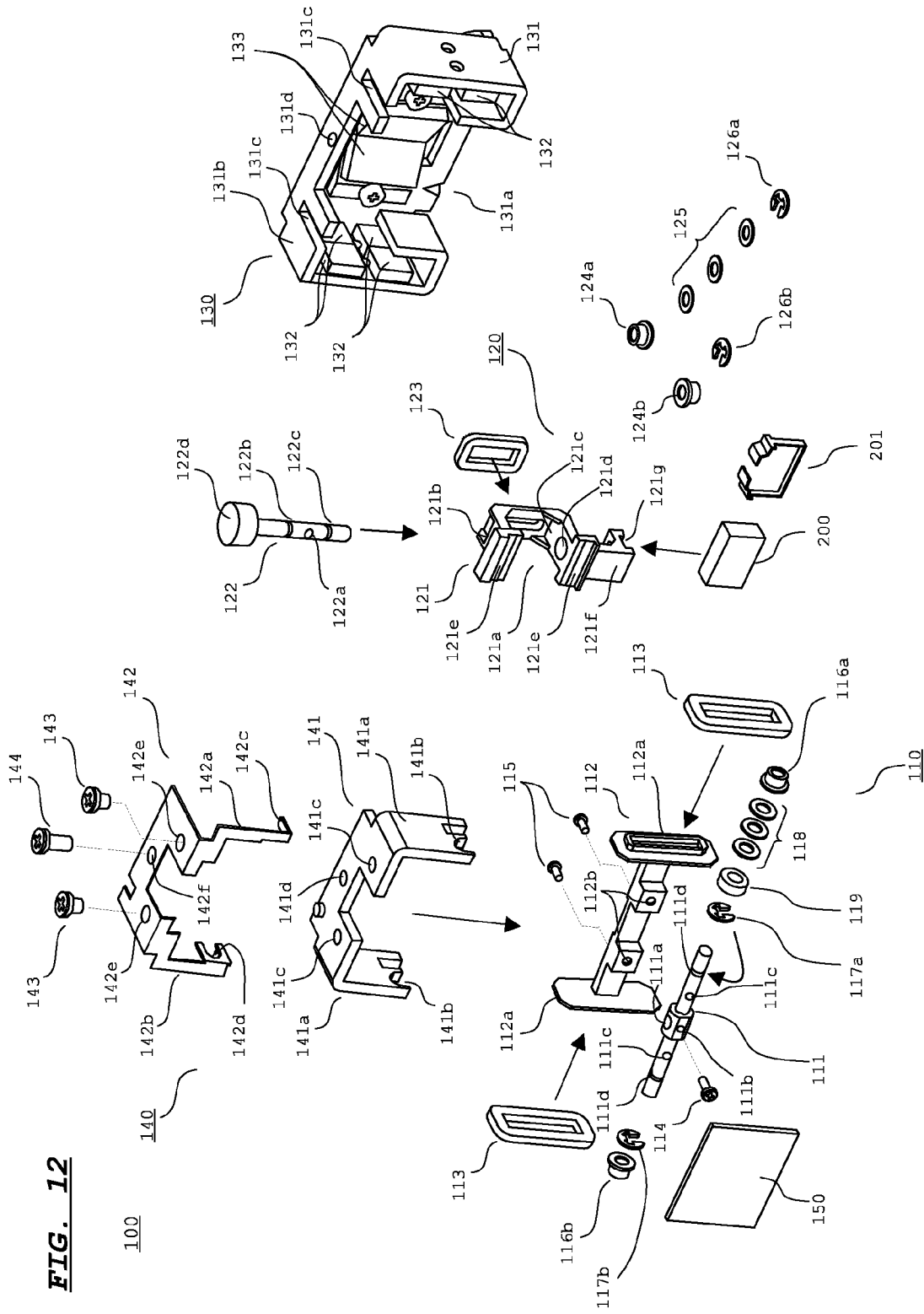

MIRROR ACTUATOR AND BEAM IRRADIATION DEVICE

This application claims priority under 35 U. S. C. Section 119 of Japanese Patent Applications No. 2009-272843 filed Nov. 30, 2009, entitled "MIRROR ACTUATOR AND BEAM IRRADIATION DEVICE" and No. 2010-185219 filed Aug. 20, 2010, entitled "MIRROR ACTUATOR AND BEAM IRRADIATION DEVICE". The disclosure of the above applications is incorporated herein by reference.

BACKGROUND OF THE INVENTION

1. Field of the Invention

The present invention relates to a mirror actuator that turns a mirror around two shafts as turning axes and a beam irradiation device equipped with such a mirror actuator.

2. Disclosure of Related Art

In recent years, laser radars have been mounted on family cars and others for enhancement of driving safety. The laser radar generally scans a target area with laser light and detects the presence or absence of any obstacle at each scan position, depending on whether there is any reflected light at each scan position. In addition, the laser radar detects a distance from an obstacle, based on an amount of time required between the instant when laser light is irradiated and the instant when reflected light is received at each scan position. The laser radar is provided with an actuator for scanning a target area with laser light.

Such an actuator may be a mirror actuator that turns a mirror around two shafts as turning axes, for example. On the mirror actuator, laser light enters the mirror in an oblique direction. When the mirror is turned horizontally and vertically around the two shafts as turning axes, the laser light is distributed horizontally and vertically in a target area.

Such a mirror actuator has clearances parallel to the two turning axes between the two turning axes and support sections supporting the turning axes. Accordingly, even if the support sections are deformed by heat or the like, it is possible to avoid the support section from being strongly pressed against the ends of the turning axes. This allows the turning axes to turn stably.

However, if these clearances are provided, when the mirror is driven and turned, the ends of the turning axes move toward the support sections and collide against the support sections. On the laser radar, the mirror turns at a high speed and in a short cycle, and therefore the turning axes repeatedly collide against the support sections in a short cycle while the mirror is driven. The repeated collisions generate noise. In addition, the collisions make small repeated impacts on the actuator, which may deteriorate the properties of the actuator.

SUMMARY OF THE INVENTION

A first aspect of the present invention relates to a mirror actuator. The mirror actuator in the first aspect includes a turning axis for turning a mirror; a support section for supporting the turning axis so as to be capable of turning; a sliding contact member that is arranged on the turning axis and is opposed to the support section in a direction parallel to the turning axis with a predetermined clearance from the support section; and a biasing arrangement that biases the turning axis in one direction parallel to the turning axis to thereby cause the sliding contact member to contact the support section.

A second aspect of the present invention relates to a beam irradiation device. The beam irradiation device in the second aspect includes a mirror actuator in the first aspect and a laser light source that supplies laser light to the mirror of the mirror actuator.

BRIEF DESCRIPTION OF THE DRAWINGS

The foregoing and other objects and novel features of the present invention will be more fully understood from the following description of a preferred embodiment when reference is made to the accompanying drawings.

FIGS. 2A and 2B are diagrams showing an assembly process of the mirror actuator in the embodiment;

FIGS. 3A and 3B are diagrams showing an assembly process of the mirror actuator in the embodiment;

FIGS. 4A to 4C are diagrams showing an assembly process of the mirror actuator in the embodiment;

FIGS. 7A and 7B are diagrams showing the optical system of the beam irradiation device in the embodiment;

FIGS. 10A and 10B are diagrams showing an assembly process of the mirror actuator in the modification example 2;

FIG. 12 is an exploded perspective view of the mirror actuator in a modification example 3;

Figure 1:
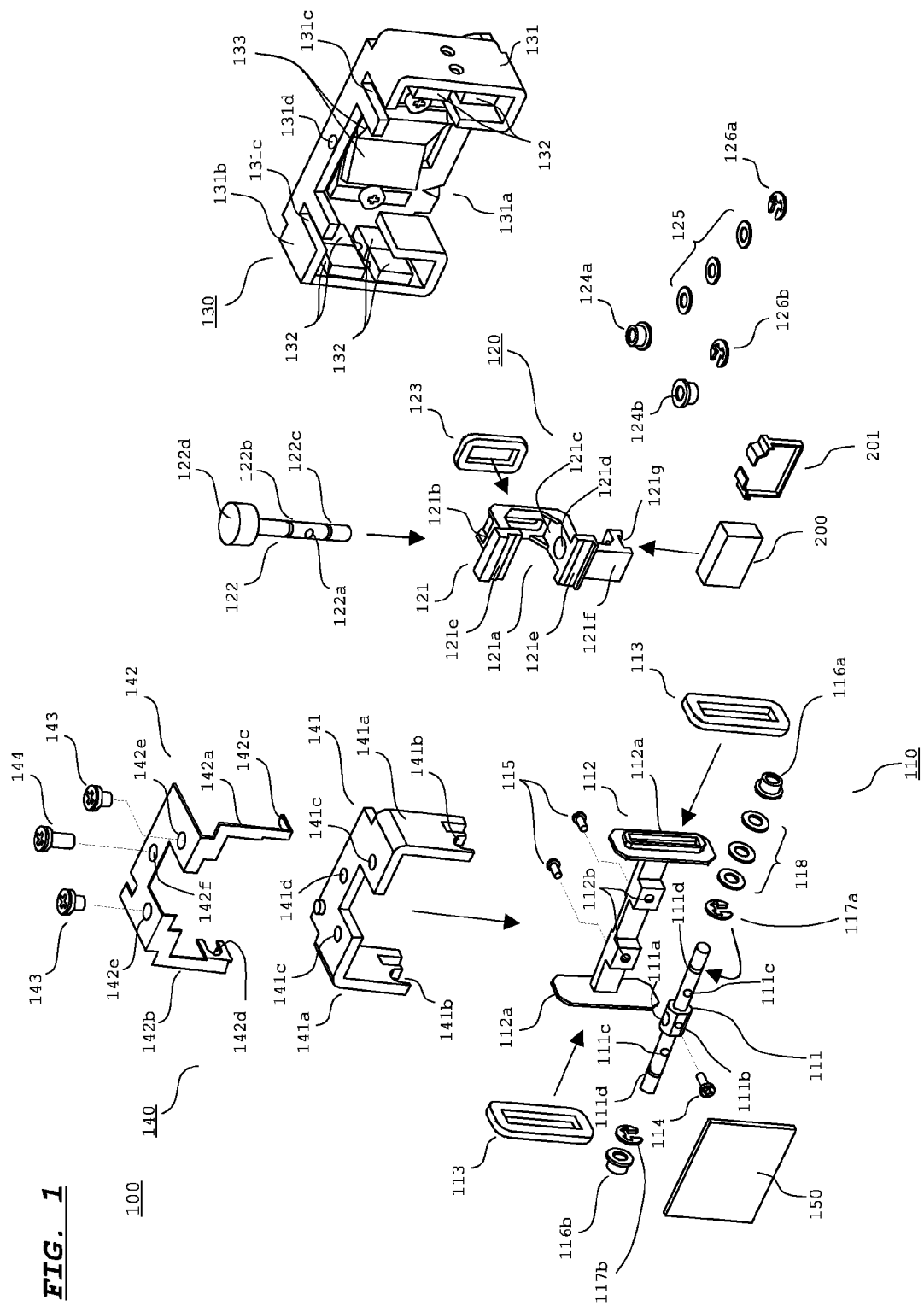
FIG. 1 is an exploded perspective view of a mirror actuator in an embodiment of the present invention.

However, the drawings are only for purpose of description, and do not limit the scope of the present invention.

DESCRIPTION OF PREFERRED EMBODIMENTS

An embodiment of the present invention will be described below with reference to the drawings.

In this embodiment, a tilt unit 110 and a pan unit 120 are equivalent to a "moving section" recited in the claims; a support shaft 111 is equivalent to a "turning axis" recited in the claims; tilt coils 113 are equivalent to a "coil" recited in the claims; an shaft bearing 116a, a yoke 141, and concave sections 141b are equivalent to a "support section" recited in the claims; poly slider washers 118 and a rubber washer 118a are equivalent to a "sliding contact member" recited in the claims; the shaft bearing 116a, an E ring 117a, a ring-shaped magnet 119, and magnets 132 are equivalent to a "biasing arrangement" recited in the claims; the E ring 117a is equivalent to a "magnetic member" recited in the claims; the rubber washer 118a is equivalent to a "buffer member" recited in the claims; the E ring 117a is equivalent to a "stopper member" recited in the claims; and a laser light source 401 is equivalent to a "laser light source" recited in the claims. However, the foregoing correspondences between the claims and this embodiment are shown as merely examples, and the claims are not limited to by this embodiment.

FIG. 1 is an exploded perspective view of a mirror actuator 100 in this embodiment.

The mirror actuator 100 includes the tilt unit 110, the pan unit 120, a magnet unit 130, a yoke unit 140, a mirror 150, and a transmissive plate 200.

The tilt unit 110 includes the support shaft 111, a tilt frame 112, and two tilt coils 113. The support shaft 111 has on a middle part thereof a hole 111a penetrating in an up-down direction and a hole 111b penetrating the hole 111a from the front side. In addition, the support shaft 111 has two screw holes 111c penetrating from front to back and two grooves 111d near both ends thereof.

The tilt frame 112 has on sides thereof coil attachment sections 112a for attachment of the tilt coils 113. In addition, the tilt frame 112 has two holes 112b penetrating from front to back at positions in alignment with the screw holes 111c of the support shaft 111.

When the two screw holes 111c of the support shaft 111 are opposed to the two holes 112b of the tilt frame 112, the two screws 115 are screwed into the screw holes 111c through the holes 112b from the back, whereby the support shaft 111 is attached to the tilt frame 112. Then, when the tilt coils 113 are attached from the right and left sides to the coil attachment sections 112a of the tilt frame 112, the tilt unit 110 is completely assembled as shown in FIG. 2A. FIG. 2A shows the support shaft 111 to which the shaft bearings 116a and 116b, the E rings 117a and 117b, and the three poly slider washers 118 are attached.

The pan unit 120 is attached to the assembled tilt unit 110 as described later. Subsequently, the tilt unit 110 is attached to the yoke 141 with the use of the shaft bearings 116a and 116b, the E rings 117a and 117b, the poly slider washers 118, and a shaft fixing member 142, as described later.

Returning to FIG. 1, the pan unit 120 includes a pan frame 121, a support shaft 122, and a pan coil 123. The pan frame 121 has an upper plate 121b and a lower plate 121c with a concave section 121a therebetween. The upper plate 121b and the lower plate 121c have holes 121d arranged one above the other through which the support shaft 122 passes. In addition, the upper plate 121b and the lower plate 121c have on front sides thereof stair sections 121e into which the mirror 150 is fitted. Further, the lower plate 121c has a leg 121f extending downward. The leg 121f has a concave section 121g into which the transmissive plate 200 is fitted. The pan frame 121 has on a rear side thereof a coil attachment section (not shown) to which the pan coil 123 is attached.

The support shaft 122 has a screw hole 122a penetrating from front to back, and grooves 122b and 122c above and below the screw hole 122a. The support shaft 122 has a balancer 122d attached to an upper end thereof. A distance between the two grooves 122b and 122c is made shorter than a distance between an inner surface of the upper plate 121b and an inner surface of the lower plate 121c in the pan frame 121.

The magnet unit 130 includes a frame 131, two pan magnets 133, and eight tilt magnets 132. The frame 131 is configured to have a concave section 131a on a front side thereof. An upper plate 131b of the frame 131 has two notches 131c formed from front to back, and has a screw hole 131d in a middle part of the frame 131. The eight magnets 132 are attached in two upper and lower lines to side inner surfaces of the frame 131. In addition, the two magnets 133 are attached to the inner surface of the frame 131 in such a manner as to be tilted in an anteroposterior direction as shown in the figure.

The yoke unit 140 includes the yoke 141 and the shaft fixing member 142. The yoke 141 is formed by a magnetic member. The yoke 141 has walls 141a on sides thereof. The walls 141a have on lower ends thereof concave sections 141b for attachment of the support shaft 111 of the tilt unit 110. The yoke 141 has on an upper side thereof two screw holes 141c penetrating in an up-down direction. Further, the yoke 141 has on the upper side thereof a hole 141d vertically penetrating at a position in alignment with the screw hole 131d of the magnet unit 130. A distance between inner surfaces of the two walls 141a is made longer than a distance between the two grooves 111d of the support shaft 111.

The shaft fixing member 142 is a metallic thin plate member with flexibility. The shaft fixing member 142 has plate springs 142a and 142b on a front side thereof. The plate springs 142a and 142b have at lower ends thereof receiving sections 142c and 142d, respectively, for preventing the shaft bearings 116a and 116b of the tilt unit 110 from dropping off. In addition, the shaft fixing member 142 has on an upper side thereof holes 142e at positions in alignment with the two screw holes 141c of the yoke 141. Further, the shaft fixing member 142 has on the upper side thereof a hole 142f at a position in alignment with the hole 141d of the yoke 141.

At assembly of the mirror actuator 100, the tilt unit 110 is first assembled as shown in FIG. 2A. Then, the pan unit 120 is attached to the support shaft 111 of the tilt unit 110 as described below.

First, the shaft bearings 124a and 124b are fitted and fixed from the concave section 121a side into the holes 121d in the upper plate 121b and the lower plate 121c of the pan frame 121, respectively. Then, the pan coil 123 is attached to the rear side of the pan frame 121. Further, the transmissive plate 200 is fitted into the concave section 121g of the pan frame 121, and then the transmissive plate 200 is fixed to the leg 121f of the pan frame 121 with a transmissive plate fixing bracket 201.

After that, the tilt frame 112 and the support shaft 111 are inserted into the concave section 121a of the pan frame 121. Then, the hole 111a of the support shaft 111 and the shaft bearings 124a and 124b of the pan frame 121 are aligned in an up-down direction. In this state, the support shaft 122 is passed from the top through the hole 111a and the shaft bearings 124a and 124b. At that time, the three poly slider washers 125 are put on the support shaft 122 in the concave section 121a. Further, the hole 111b of the support shaft 111 is aligned with the screw hole 122a of the support shaft 122, and then the screw 114 is screwed from the front side through the hole 111b into the screw hole 122a. Accordingly, the support shaft 122 is fixed to the support shaft 111.

Subsequently, the pan frame 121 is slid in such a manner that the three poly slider washers 125 are positioned under the lower groove 122c of the support shaft 122, and then the E ring 126b is fitted into the lower groove 122c. Further, the upper groove 122b of the support shaft 122 is positioned within the concave section 121a, and then the E ring 126a is fitted into the upper groove 122b. Accordingly, the pan unit 120 is attached to the tilt unit 110 as shown in FIG. 2B. In this state, the pan frame 121 is capable of turning around the support shaft 122 and capable of moving slightly in an up-down direction along the support shaft 122.

After the pan unit 120 is attached as described above, the mirror 150 is fitted and fixed into the stair sections 121e of the pan frame 121. After that, the shaft bearings 116a and 116b attached to the both ends of the support shaft 111 in the tilt unit 110 are fitted into the concave sections 141a and 141b of the yoke 141 shown in FIG. 1. Then, in this state, the shaft fixing member 142 is attached to the yoke 141 such that the shaft bearings 116a and 116b do not drop off the concave sections 141b and 141b, respectively. Specifically, the shaft fixing member 142 is attached to the yoke 141 in such a manner that the receiving section 142c supports the shaft bearing 116a from below and the receiving section 142d pinches the shaft bearing 116b from the front side. In this state, the two screws 143 are screwed into the screw holes 141c of the yoke 141 through the two holes 142e. Accordingly, the structure shown in FIG. 2B is attached to the yoke unit 140.

This way, the structure shown in FIG. 3A is completely assembled. In this state, the tilt frame 112 is capable of turning around the support shaft 111 integrally with the pan frame 121, and is capable of moving slightly in a right-left direction along the support shaft 111.

As described above, the support shaft 111 is attached at the both ends to the concave sections 141b of the yoke 141 by the shaft fixing member 142 so as to be capable of elastic displacement. FIG. 4A is a cross-section view of FIG. 4C taken along A-A', and FIG. 4B is a cross-section view of FIG. 4C taken along B-B'. As shown in an enlarged view of FIG. 4B, the concave section 141b is configured to have two straight line sections L1, two straight line sections L2 inclined at a specific angle from the straight line sections L1, and a curved section L3 linking the two straight line sections L2. A width W between the two straight sections L1 is approximately identical to an outer diameter of the shaft bearings 116a and 116b. Both of the two concave sections 141b on the yoke 141 have the shape as described above.

When the two shaft bearings 116a and 116b are inserted from below into the corresponding concave sections 141b, the two straight sections L1 and the two straight sections L2 are brought into contact with outer circumferences of the shaft bearings 116a and 116b, respectively. At that time, the curved sections L3 do not contact the shaft bearings 116a and 116b. In this state, the shaft bearing 116a is pressed upward by a retainer plate B of the receiving section 142c, as shown in FIG. 4B. Accordingly, the shaft bearing 116b is attached to the concave section 141b.

Although not shown in FIG. 4A, the shaft bearing 116b is also attached to the concave section 141b in the same manner as described above. As shown in an enlarged view of FIG. 4A, the receiving section 142d has also a retainer plate B for pressing the shaft bearing 116b upward. The shaft bearing 116b is pressed upward by this retainer plate B.

The both ends of the support shaft 111 are not firmly fixed to the concave sections 141b and are capable of elastic displacement because the retainer plates B are capable of elastic deformation. Since the support shaft 111 can be elastically displaced at the both ends, the support shaft 111 can be attached smoothly to the concave sections 141b even if the support shaft 111 is formed with any error in shape or the concave sections 141b are formed with any error in shape and arrangement. In addition, the support shaft 111 can be rotated without problems.

The thus assembled structure of FIG. 3A is attached to the magnet unit 130 in such a manner that the two walls 141a of the yoke 141 are inserted into the notches 131c of the frame 131 in the magnet unit 130. Then, in this state, the screw 144 is screwed into the screw hole 131d of the magnet unit 130 through the hole 142f of the shaft fixing member 142 and the hole 141d of the yoke 141. Accordingly, the structure of FIG. 3A is attached and fixed to the magnet unit 130. This way, the mirror actuator 100 is completely assembled as shown in FIG. 3B.

In the assembled state shown in FIG. 3B, when the pan frame 121 turns around the support shaft 122 as a turning axis, the mirror 150 turns accordingly. In addition, when the tilt frame 112 turns around the support shaft 111 as a turning axis, the pan unit 120 turns accordingly, and the mirror 150 also turns integrally with the pan unit 120. In this manner, the mirror 150 is supported so as to be capable of turning by the mutually orthogonal support shafts 111 and 122. Further, the mirror 150 also turns around the support shafts 111 and 122 when the tilt coils 113 and the pan coil 123 are energized. At that time, the transmissive plate 200 attached to the pan unit 120 turns together with the turning of the mirror 150.

A balancer 122d is intended to adjust the structure shown in FIG. 2B to turn around the support shaft 111 in a well-balanced manner. The balance of the turning is adjusted by the weight of the balancer 122d. Besides, if the balancer 122d can be vertically displaced, the balance of the turning can be adjusted by fine-tuning the lower position of the balancer 122d.

In the assembled state of FIG. 3B, the eight magnets 132 are adjusted in layout and polarity so as to allow the tilt frame 112 to generate a turning force around the support shaft 111 by applying electricity to the tilt coils 113. Therefore, when electricity is applied to the tilt coils 113, the tilt frame 112 turns around the support shaft 111 by an electromagnetic driving force generated on the tilt coils 113. With the turning of the tilt frame 112, the mirror 150 and the transmissive plate 200 turn accordingly.

In addition, in the assembled state of FIG. 3B, the two magnets 133 are adjusted in layout and polarity so as to allow the pan frame 121 to generate a turning force around the support shaft 122 by applying electricity to the pan coil 123. Therefore, when electricity is applied to the pan coil 123, the pan frame 121 turns around the support shaft 122 by an electromagnetic driving force generated on the pan coil 123. With the turning of the pan frame 121, the mirror 150 and transmissive plate 200 turn accordingly.

In the mirror actuator 100 of this embodiment, the support shaft 111 is movable in a right-left direction. Accordingly, even if the yoke 141 is deformed due to a temperature change to alter the degree of tilt (opening) of the two walls 141a of the yoke 141, it is possible to turn the support shaft 111 smoothly without applying an undesired force to the support shaft 111 in a right-left direction. From the same viewpoint, the support shaft 122 is also movable in an up-down direction. In particular, if the mirror actuator 100 is mounted on an in-vehicle laser radar, the support shafts 111 and 122 need to be movable because of larger temperature changes.

However, if the support shaft 111 is movable in a right-left direction as described above, when the mirror 150 is driven and turned in a right-left direction (pan direction), the ends of the support shaft 111 move in a right-left direction and collide against the shaft bearings 116a and 116b. If the mirror actuator 100 is mounted on a laser radar, the mirror 150 turns in the pan direction at a high speed and in a short cycle. Accordingly, while the mirror 150 is driven, the support shaft 111 repeatedly collides against the shaft bearings 116a and 116b in a short cycle. Such repeated collisions cause noise and may deteriorate the properties of the actuator 100. Meanwhile, the support shaft 122 is less prone to cause such collision under a downward force by gravity.

Accordingly, in this embodiment, only the right E ring 117a is formed by a magnetic material. The left E ring 117b is formed by a nonmagnetic material.

Figure 5B:
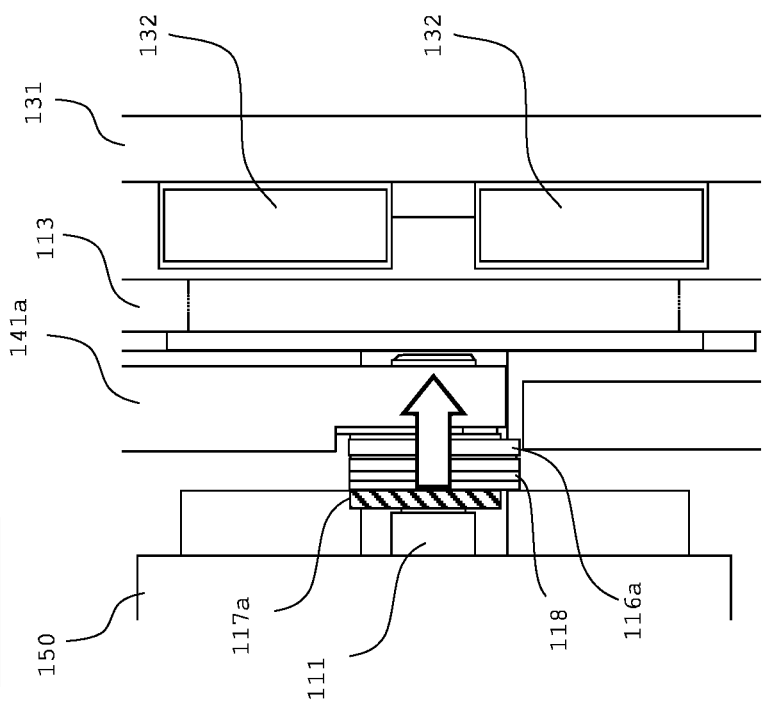
FIGS. 5A and 5B are diagrams for describing an advantage of the mirror actuator in the embodiment.
Figure 5A:
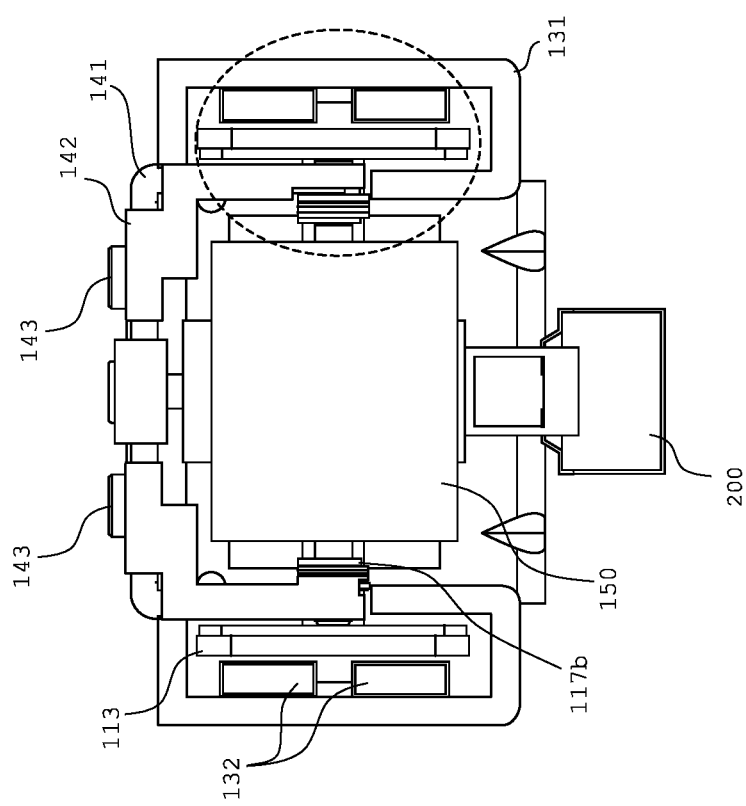

FIGS. 5A and 5B are diagrams for describing an advantage of configuring the E rings 117a and 117b in such a manner. FIG. 5A is a front view of the mirror actuator 100, and FIG. 5B is an enlarged view of a part shown by a dashed line in FIG. 5A.

When only the right E ring 117a is formed by a magnetic material as described above, a magnetic force is generated between the E ring 117a and the right magnet 132 of the magnet unit 130. This magnetic force biases the support shaft 111 to the right. On occurrence of this biasing, the poly slider washers 118 are pressed by the E ring 117a against the shaft bearing 116a. This prevents the support shaft 111 from moving in a right-left direction when the mirror 150 is turned in the pan direction. Accordingly, it is possible to suppress noise generation as described above and prevent the mirror actuator 100 from being deteriorated in properties due to collision of the support shaft 111.

The three poly slider washers 118 are interposed between the E ring 117a and the shaft bearing 116a. Accordingly, the support shaft 111 can turn smoothly even if being biased as described above. Therefore, the mirror 150 can be favorably turned in an up-down direction (tilt direction).

Figure 6:
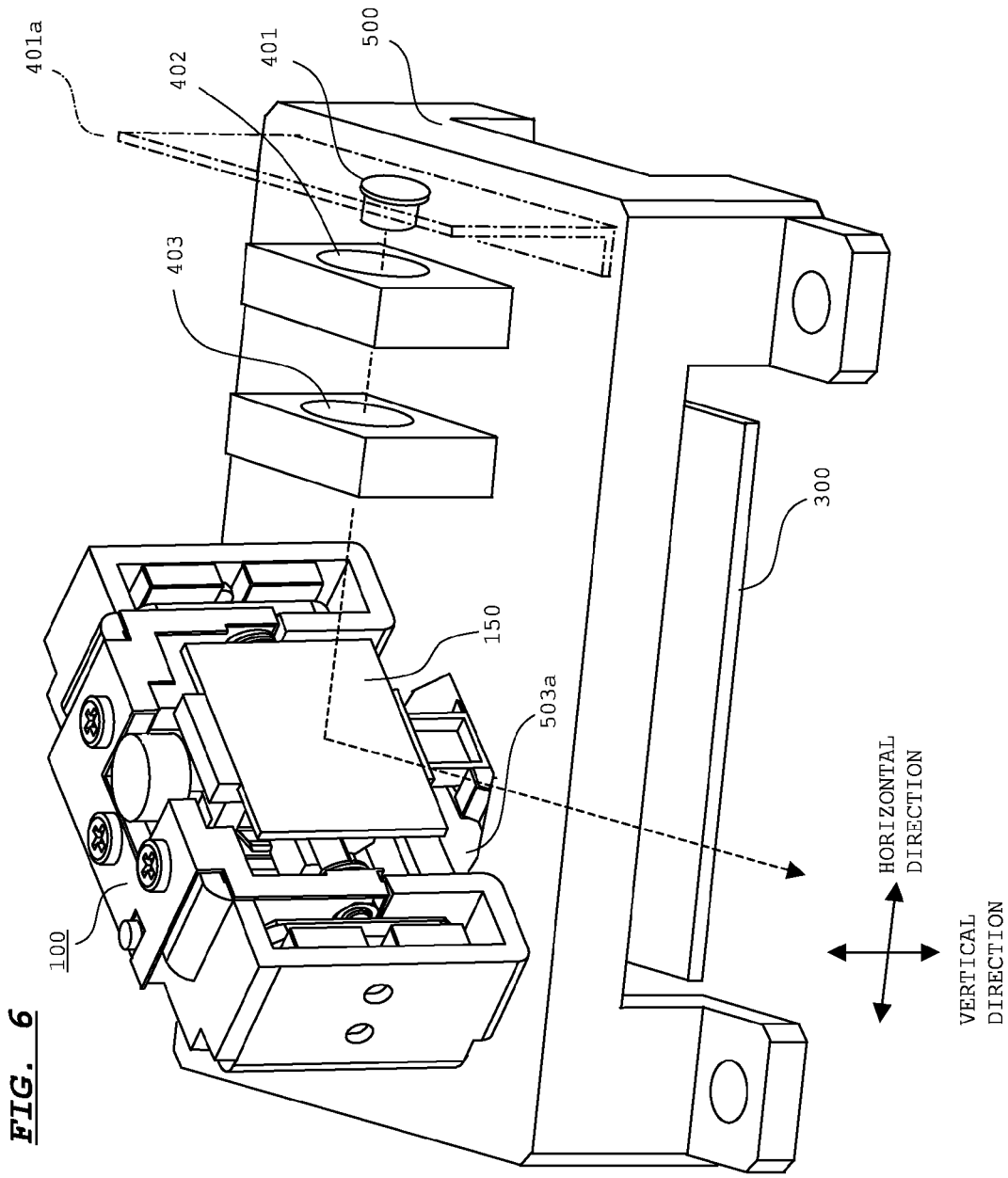
FIG. 6 is a diagram showing an optical system of a beam irradiation device in the embodiment.

FIGS. 6, 7A, and 7B are diagrams showing a configuration of a beam irradiation device with the mirror actuator 100.

FIG. 6 is a diagram showing a scanning optical system. In FIG. 6, reference numeral 500 denotes a base, and the base 500 has a horizontal top surface. The base 500 has an opening 503a at a mounting position of the mirror actuator 100. The mirror actuator 100 is attached to the base 500 such that the transmissive plate 200 is inserted into the opening 503a. The mirror actuator 100 is attached to the base 500, such that the up-down direction shown in FIG. 1 corresponds to the vertical direction shown in FIGS. 4A to 4C.

The base 500 has on the top surface thereof a laser light source 401 and beam shaping lenses 402 and 403. The laser light source 401 is attached to a laser light source substrate 401a on the top surface of the base 500.

Laser light emitted from the laser light source 401 (hereinafter, referred to as "scanning laser light") is subjected to convergence in horizontal and vertical directions by the lenses 402 and 403, respectively. The lenses 402 and 403 are designed such that a beam has a predetermined size (about 2 m long and 1 m wide, for example) in a target area (which is set at a position of about 100 m forward of a beam window of the beam irradiation device, for example).

The lens 402 is a cylindrical lens having a lens effect in a vertical direction. The lens 403 is an aspherical lens to make scanning laser light approximately parallel. Beams emitted from the laser light source have different spread angles in vertical and horizontal directions. The first lens 402 changes a ratio of spread angles of laser light in vertical and horizontal directions. The second lens 403 changes magnifications of spread angles of emitted beams (both in vertical and horizontal directions).

The scanning laser light having passed through the lenses 402 and 403 enters the mirror 150 of the mirror actuator 100, and is reflected by the mirror 150 toward a target area. When the mirror 150 is biaxially driven by the mirror actuator 100, the target area is scanned with the scanning laser light.

The mirror actuator 100 is arranged in such a manner that, when the mirror 150 is in a neutral position, the scanning laser light from the lens 403 enters a mirror surface of the mirror 150 at an incident angle of 45 degrees in a horizontal direction. The "neutral position" refers to a position of the mirror 150 in which the mirror surface is parallel to a vertical direction and the scanning laser light enters the mirror surface at an incident angle of 45 degrees in a horizontal direction.

The base 500 has a circuit board 300 on a bottom surface thereof. The base 500 also has circuit boards 301 and 302 on rear and side surfaces thereof.

FIG. 7A is a partial planar view of the base 500 as seen from the underside. FIG. 7A shows a servo optical system and peripheral arrangements of the same arranged on the underside of the base 500.

As shown in the figure, walls 501 and 502 are formed around the underside of the base 500. A central area from the walls 501 and 502 has a planar surface 503 that is lower by one level than the walls 501 and 502. The wall 501 has an opening for attachment of a semiconductor laser 303. The circuit board 301 with the semiconductor laser 303 is attached to an outer surface of the wall 501 so that the semiconductor laser 303 is inserted to the opening. Meanwhile, the circuit board 302 with a PSD 308 is attached near the wall 502.

A condenser lens 304, an aperture 305, and a neutral density (ND) filter 306 are attached by a mounting bracket 307 to the planar surface 503 on the underside of the base 500. Further, the planar surface 503 has the opening 503a as described above. The transmissive plate 200 attached to the mirror actuator 100 projects to the underside of the base 500 through the opening 503a. Here, the transmissive plate 200 is positioned in such a manner that, when the mirror 150 of the mirror actuator 100 is in the neutral position, the two planar surfaces are parallel to a vertical direction and are tilted at an angle of 45 degrees relative to an outgoing light axis of the semiconductor laser 303.

Laser light emitted from the semiconductor laser 303 (hereinafter, referred to as "servo light") passes through the condenser lens 304, and then is reduced in beam diameter by the aperture 305. The servo light is further attenuated by the ND filter 306. After that, the servo light is entered into the transmissive plate 200 and subjected to refraction by the transmissive plate 200. Then, the servo light having passed through the transmissive plate 200 is received by the PSD 308. The PSD 308 outputs a position detection signal in accordance with a light-receiving position.

FIG. 7B is a diagram showing schematically a relationship between a turning position of the transmissive plate 200 and a path of the servo light. For the sake of simplicity, FIG. 7B illustrates only the transmissive plate 200, the semiconductor laser 303, and the PSD 308 of FIG. 5A.

The servo light is refracted by the transmissive plate 200 tilted relative to the laser light axis, and then is received by the PSD 308. Here, when the transmissive plate 200 turns as shown by a dashed arrow in FIG. 7B, the path of the servo light changes as shown by a dotted line in FIG. 7B, and the receiving position of the servo light on the PSD 308 changes accordingly. Therefore, the turning position of the transmissive plate 200 can be determined by the receiving position of the servo light detected by the PSD 308. The turning position of the transmissive plate 200 corresponds to the scanning position of the scanning laser light in the target area. Therefore, the scanning position of the scanning laser light in the target area can be detected in accordance with a signal from the PSD 308.

According to this embodiment as described above, the movement of the support shaft 111 in an axial direction can be suppressed by a magnetic force between the E ring 117a and the right magnet 132 of the magnet unit 130. Accordingly, it is possible to prevent that the support shaft 111 collides against the shaft bearings 116a and 116b during mirror driving. Therefore, it is possible to suppress noise generation by such collision and prevent the mirror actuator 100 from being deteriorated in properties due to such collision.

In addition, according to this embodiment, the support shaft 111 is biased by the magnets 132 for driving the tilt unit 110. This allows the mirror actuator 100 to be simplified in structure as compared with the case of providing an additional biasing arrangement. Further, the E ring 117a is formed by a magnetic material so as to generate a magnetic force between the E ring 117a and the magnet 132. Therefore, it is possible to simplify the structure as compared with the case of providing an additional magnetic member.

In this embodiment, the magnetic member is arranged on the support shaft 111 to generate a magnetic force between the magnetic member and the magnet 132. Alternatively, the magnetic member may be arranged at another position such as the tilt frame 112 or the pan frame 121 to bias the support shaft 111 in one direction. In addition, a magnet may be arranged in place of the magnetic member.

Although the embodiment of the present invention is as described above, the present invention is not limited to by the embodiment. Besides, the embodiment of the present invention can be further modified in various manners other than those described above.

MODIFICATION EXAMPLE 1

Figure 8B:
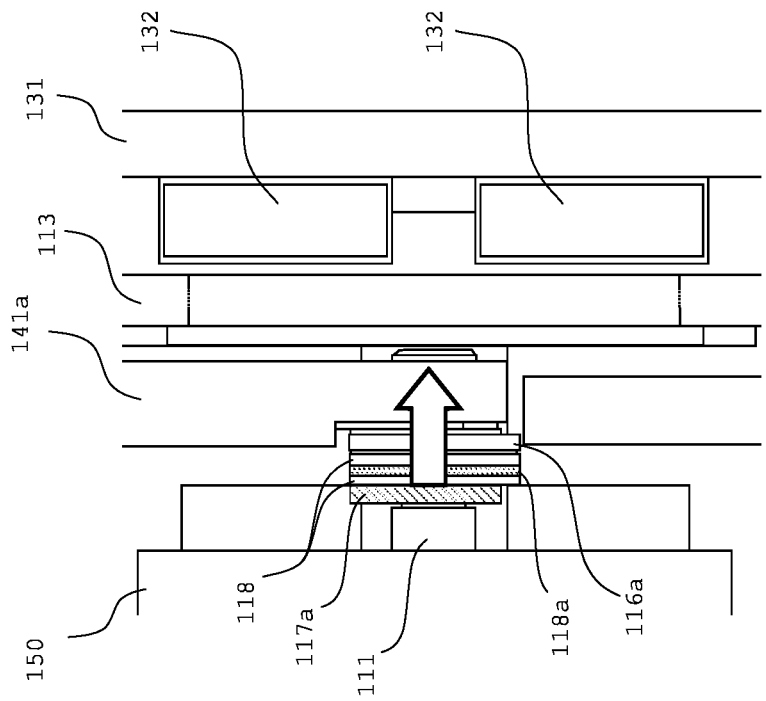
FIGS. 8A and 8B are diagrams for describing a configuration and an advantage of the mirror actuator in a modification example 1.
Figure 8A:
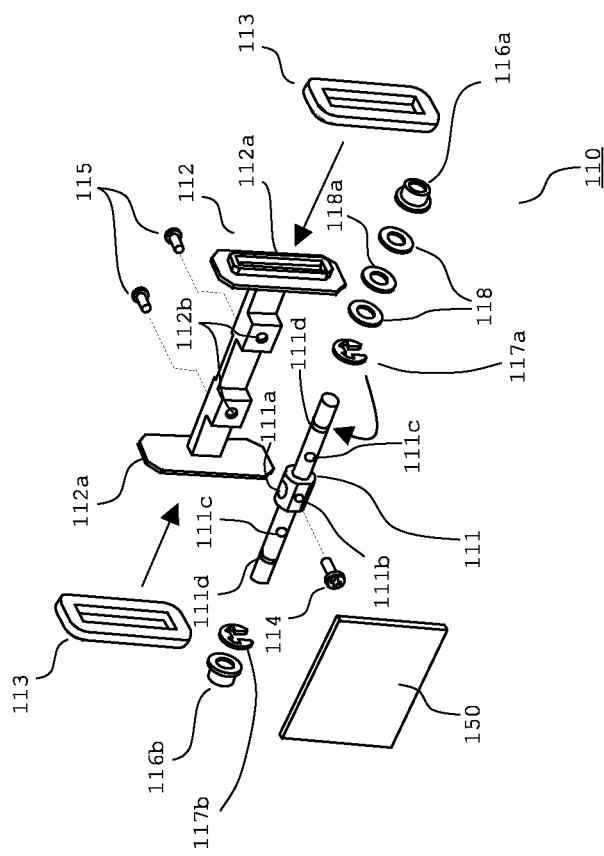

FIGS. 8A and 8B are diagrams showing a configuration of a modification example. FIG. 8A is an exploded perspective view of the tilt unit 110. FIG. 8B is an enlarged view of a right end and its neighboring portion of the support shaft 111 in the tilt unit 110 assembled into the mirror actuator 100.

In the modification example 1, out of the three poly slider washers 118, the middle one is replaced by a rubber washer 118*a*. According to this configuration, even if, during mirror driving, the support shaft 111 moves to the left against a magnetic force between the E ring 117*a* and the magnet 132 and then the support shaft 111 moves again to the right and collides against the shaft bearing 116*a*, the impact of the collision is absorbed by the rubber washer 118*a*. Accordingly, even if the support shaft 111 moves in such a manner as described above, it is possible to suppress generation of noise and property deterioration of the mirror actuator 100 due to the collision of the support shaft 111.

MODIFICATION EXAMPLE 2

Figure 9:
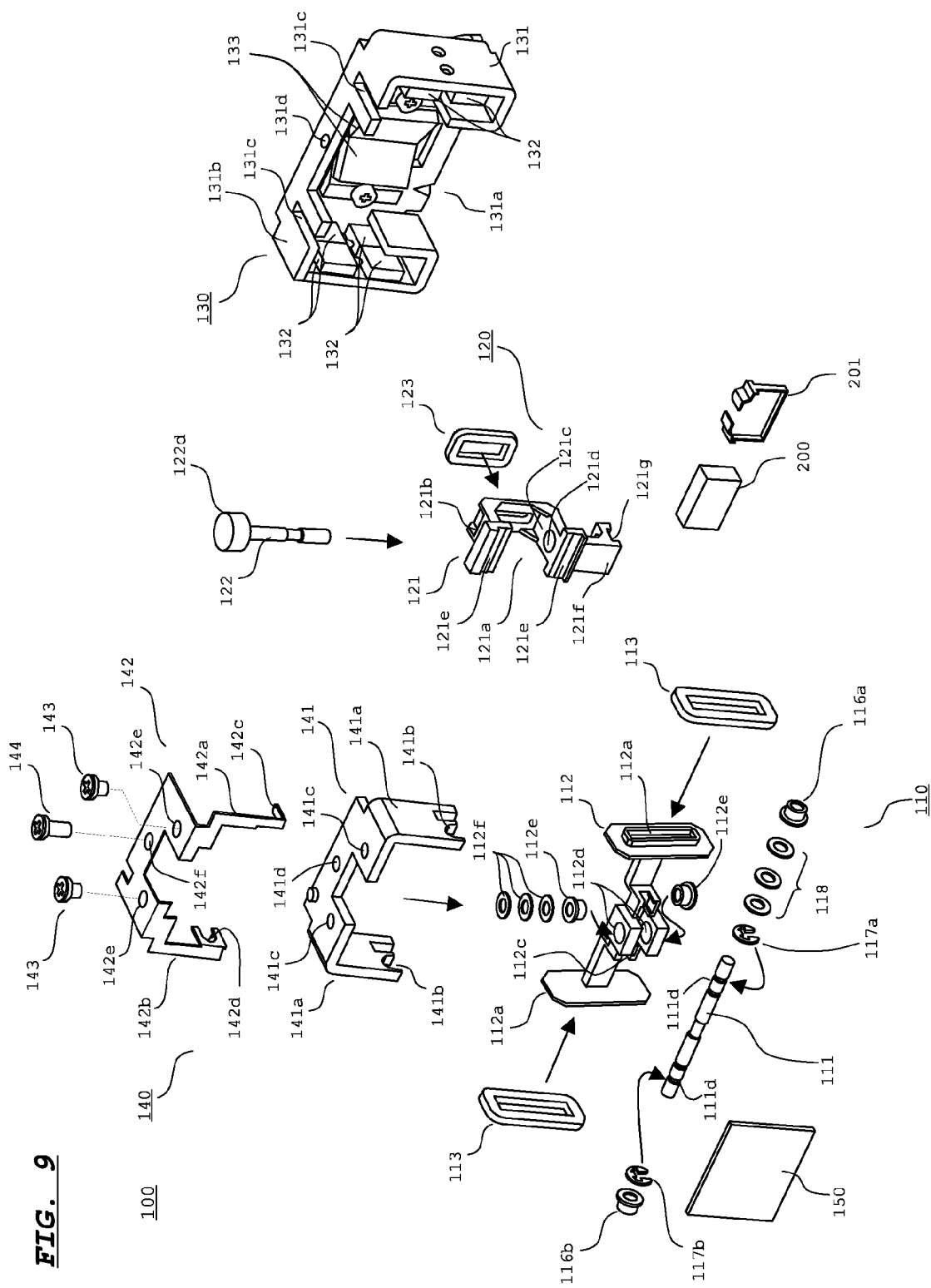
FIG. 9 is a diagram showing an exploded perspective view of the mirror actuator in a modification example 2.

FIG. 9 is a diagram showing a modification example of the mirror actuator 100. The same components as those of the configuration shown in FIG. 1 are given the same reference numerals as those in the configuration of FIG. 1. The modification example 2 is different from the foregoing embodiment, in the way of attaching the support shaft 111 to the tilt frame 112 and the way of attaching the pan frame 121 to the tilt frame 112. Accordingly, the modification example has additional components 112*c*, 112*d*, 112*e*, and 112*f*.

As in the foregoing embodiment, the support shaft 111 including at both ends thereof the shaft bearings 116*a* and 116*b*, the E rings 117*a* and 117*b*, and the poly slider washers 118, is fitted into the groove 112*c* formed in the tilt frame 112, and attached and fixed to the tilt frame 112. The tilt frame 112 has two vertically arranged holes 112*d* into which the shaft bearings 112*e* are fitted from above and below. Accordingly, the tilt unit 110 is completely assembled as shown in FIG. 10A.

Subsequently, the tilt frame 112 is placed into the concave section 121*a* of the pan frame 121. Then, the pan frame 121 is positioned in such a manner the two shaft bearings 112*e* and the holes 121*d* of the pan frame 121 are vertically aligned. In that state, the support shaft 122 is inserted into the two shaft bearings 112*e* and the holes 121*d* of the pan frame 121. At that time, the three poly slider washers 112*f* are interposed between the upper shaft bearing 112*e* and the upper plate 121*b* of the pan frame 121. Then, the poly slider washers 112*f* are put on the shaft bearing 122. After that, the shaft bearing 122 is fixed to the pan frame 121 with an adhesive. Accordingly, a structure is formed as shown in FIG. 10B.

Figure 11A:
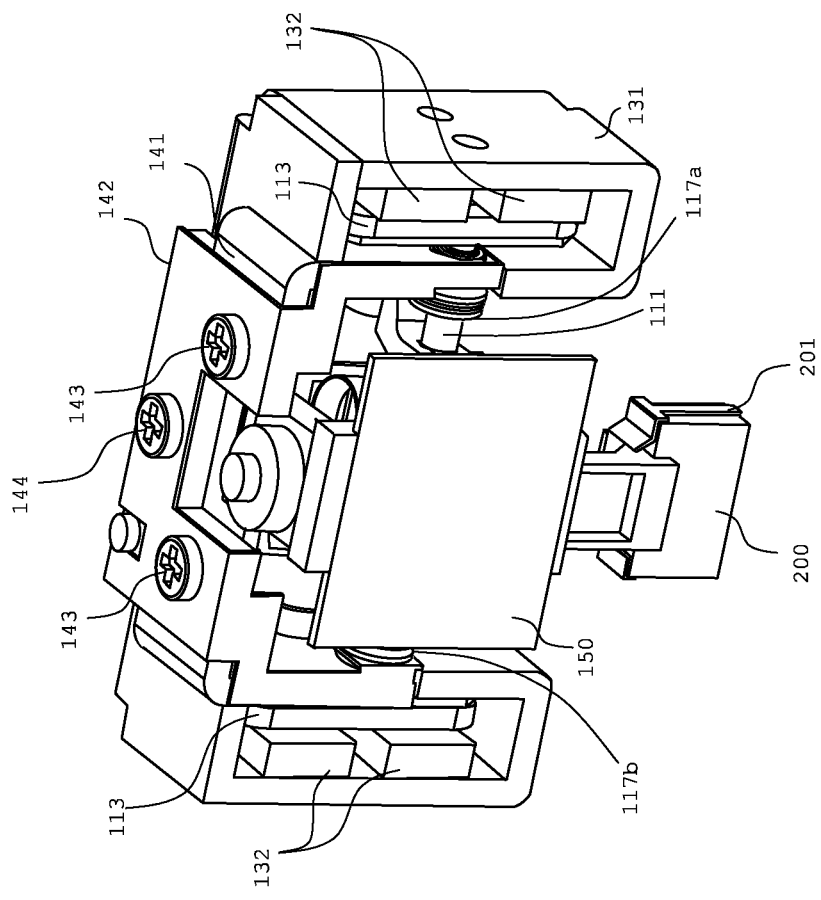
FIGS. 11A and 11B are diagrams showing an assembly process of the mirror actuator in the modification example 2.
Figure 11B:
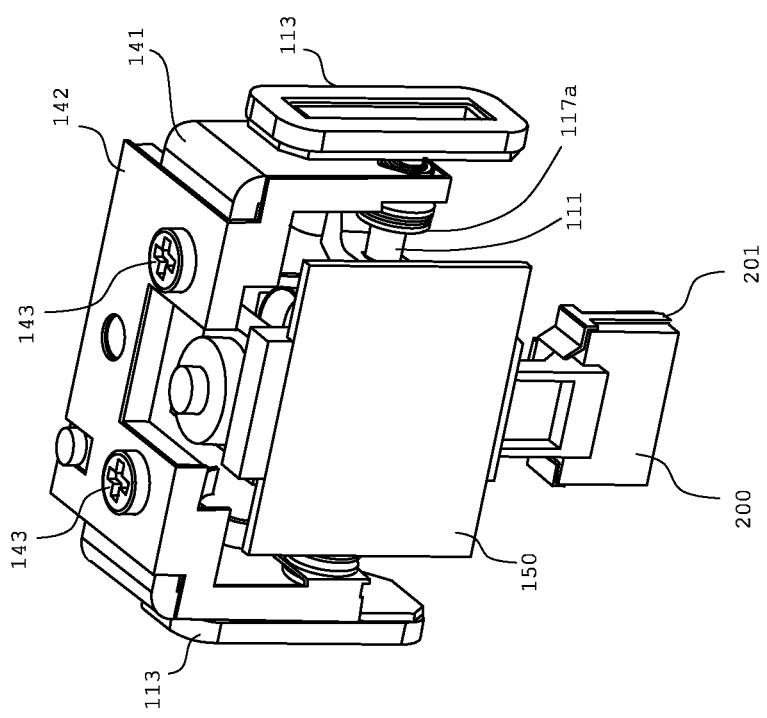

Subsequently, the support shaft 111 is attached to the yoke 141 as in the foregoing embodiment, to form a structure shown in FIG. 11A. Further, the structure shown in FIG. 11A is attached to the magnet unit 130 as in the foregoing embodiment, to complete the mirror actuator 100 shown in FIG. 11B.

In this modification example, with regard to the two E rings 117*a* and 117*b* attached to the support shaft 111, the right E ring 117*a* is formed by a magnetic material and the left E ring 117*b* is formed by a non-magnetic material. Accordingly, the support shaft 111 is biased to the right by a magnetic force between the E ring 117*a* and the right magnet 132, thereby suppressing the movement of the support shaft 111 during mirror driving, as in the foregoing embodiment. Therefore, this modification example also makes it possible to prevent noise generation and property deterioration of the mirror actuator 100 due to collision of the support shaft 111, as in the foregoing embodiment.

MODIFICATION EXAMPLE 3

FIG. 12 is a diagram showing another modification example of the mirror actuator 100. In FIG. 12, the same components as those of the configuration shown in FIG. 1 are given the same reference numerals as those in the configuration of FIG. 1.

In the modification example 3, the shaft bearing 116*a* is formed by a magnetic member. Further, the ring-shaped magnet 119 is sandwiched between the E ring 117*a* and the poly slider washers 118. The ring-shaped magnet 119 is attached to the support shaft 111 in such a manner that support shaft 111 passes through a hole of the ring-shaped magnet 119.

The E ring 117*a* is formed by a magnetic member, as in the foregoing embodiment.

An outer diameter of the ring-shaped magnet 119 is approximately identical to an outer diameter of the E ring 117*a*. Since the E ring 117*a* is formed by a magnetic member, the E ring 117*a* and the ring-shaped magnet 119 are stuck to each other by area contact by a magnetic force. In addition, the E ring 117*a* is fitted into the groove 111*d* of the support shaft 111 so as to be integrated with the support shaft 111. Accordingly, when the ring-shaped magnet 119 moves in an axial direction of the support shaft 111, the support shaft 111 moves accordingly.

Figure 13B:
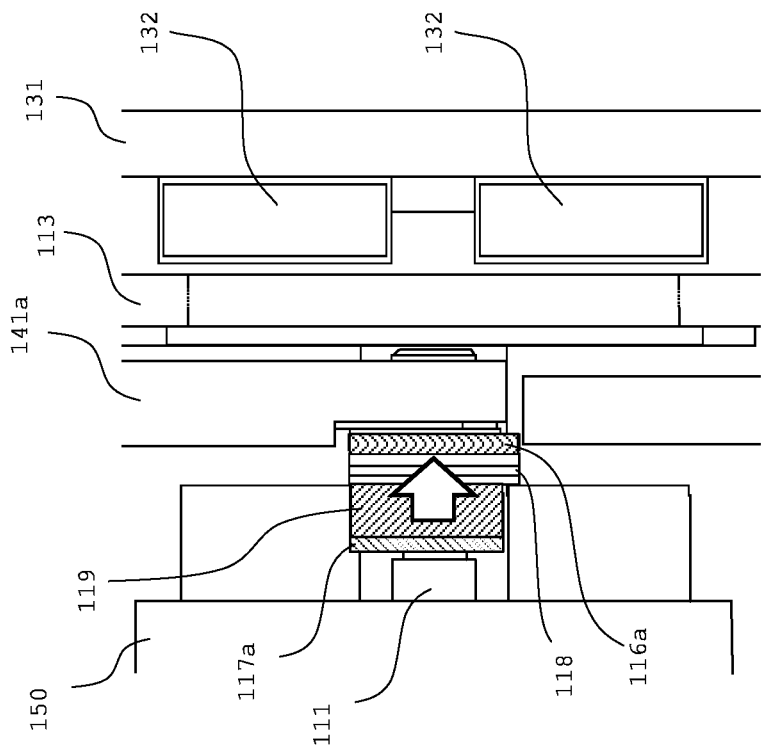
FIGS. 13A and 13B are diagrams for describing a configuration and an advantage of the mirror actuator in the modification example 3.
Figure 13A:
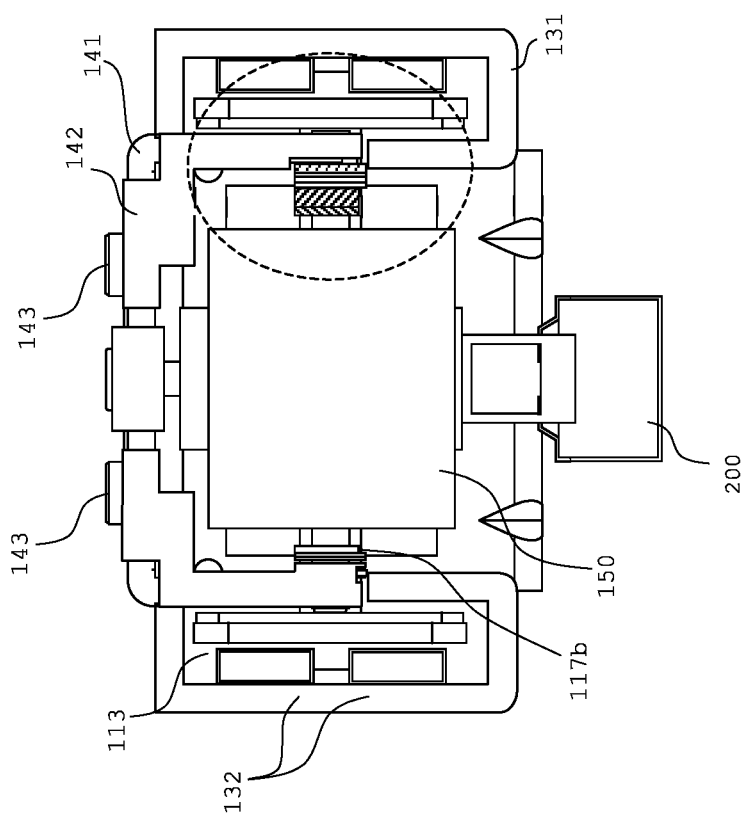

FIGS. 13A and 13B are diagrams for describing an advantage of the modification example 3.

In the modification example 3, since the shaft bearing 116*a* is formed by a magnetic member, a magnetic force is generated between the shaft bearing 116*a* and the ring-shaped magnet 119 by which the two components attract each other. Since the shaft bearing 116*a* is fixed with the shaft fixing member 142, the ring-shaped magnet 119 is biased toward the shaft bearing 116*a* by this magnetic force. When the ring-shaped magnet 119 is biased in this way, the support shaft 111 is biased to the right via the E ring 117*a* as described above. At that time, the poly slider washers 118 are pressed toward the shaft bearing 116*a*, that is, to the right.

Accordingly, when the mirror 150 is turned in the pan direction, it is possible to suppress the movement of the support shaft 111 in a right-left direction and therefore prevent collision of the support shaft 111 against the shaft bearings 116*a* and 116*b*. This makes it possible to prevent noise generation and property deterioration of the mirror actuator 100 due to such collision.

According to the modification example 3, the distance between the ring-shaped magnet 119 and the shaft bearing 116*a* is made short. Therefore, a larger axial bias can be applied to the support shaft 111 as compared with the case of the foregoing embodiment. This makes it possible to prevent the movement of the support shaft 111 during mirror driving in a more reliable manner as compared with the case of the foregoing embodiment. Therefore, it is possible to prevent noise generation and property deterioration of the mirror actuator 100 due to collision of the support shaft 111.

In the configuration of the modification example 3, the middle one of the three poly slider washers 118 may be replaced by a rubber washer, as in the modification example 1. According to this configuration, even if, during mirror driving, the support shaft 111 moves to the left against a magnetic force between the ring-shaped magnet 119 and the shaft bearing 116a and then the support shaft 111 moves again to the right and collides against the shaft bearing 116a, the impact of the collision is absorbed by the rubber washer. Accordingly, even if the support shaft 111 moves in such a manner, it is possible to prevent noise generation and property deterioration of the mirror actuator 100 due to the collision of the support shaft 111.

Figure 14:
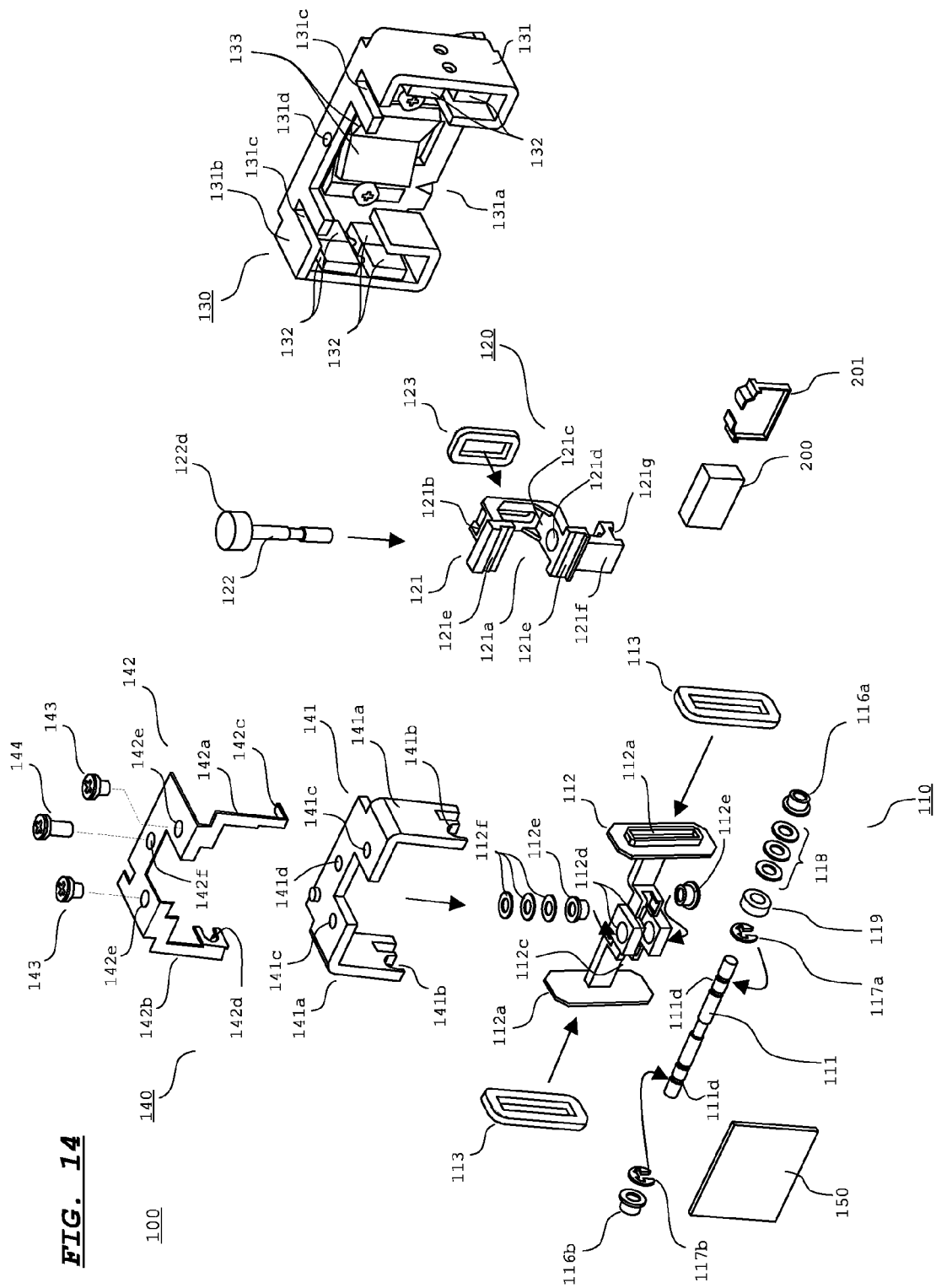
FIG. 14 is a diagram showing a configuration of the partially modified mirror actuator in the modification example 2.

In addition, as shown in FIG. 14, the configuration of the modification example 3 may be applied to the mirror actuator in the modification example 2 (refer to FIG. 9). In FIG. 14, the shaft bearing 116a is formed by a magnetic member in the configuration of the modification example 2. Further, the ring-shaped magnet 119 is positioned between the E ring 117a and the poly slider washers 118. The ring-shaped magnet 119 is attached to the support shaft 111 in such a manner that the support shaft 111 passes through the hole of the ring-shaped magnet 119. In this configuration, the E ring 117a is formed by a magnetic member as in the modification example 2. In FIG. 14, the same components as those of the configuration shown in FIG. 9 are given the same reference numerals as those in the configuration of FIG. 9.

In this configuration example, the support shaft 111 is biased to the right by a magnetic force acting between the ring-shaped magnet 119 and the shaft bearing 116a, thereby preventing the movement of the shaft 111 during mirror driving. Accordingly, in this configuration example, it is possible to prevent noise generation and property deterioration of the mirror actuator 100 due to the collision of the support shaft 111, as in the foregoing embodiment.

In the modification example 3, the ring-shaped magnet 119 and the E ring 117a are stuck to each other by a magnet force, whereby the support shaft 111 and the ring-shaped magnet 119 are integrated. Alternatively, the ring-shaped magnet 119 may be attached to and integrated with the support shaft 111 with an adhesive or the like. In particular, if the E ring 117a is not formed by a magnetic material, the ring-shaped magnet 119 is integrally attached to the support shaft 111 with an adhesive or the like.

OTHERS

The foregoing embodiment employs a semiconductor laser as a servo light source, but a light emitting diode (LED) may be used instead.

Further, the transmissive plate 200 is used to change the traveling direction of servo light in the foregoing embodiment. Alternatively, a servo mirror instead of the transmissive plate may be attached to the lower end of the pan unit 120 to reflect servo light, thereby changing the traveling direction of the servo light. Besides, a light source emitting servo light may be arranged at the lower end of the pan unit 120.

In addition, although only the support shaft 111 is biased by a magnetic force in the foregoing embodiment, the support shaft 122 may also be biased in an axial direction.

Besides, the embodiment of the present invention can be appropriately modified in various manners within the scope of technical ideas shown in the claims.

What is claimed is:

1. A mirror actuator, comprising:
   a turning axis for turning a mirror;
   a support section for supporting the turning axis so as to be capable of turning;
   a sliding contact member that is arranged on the turning axis and is opposed to the support section in a direction parallel to the turning axis with a predetermined clearance from the support section; and
   a biasing arrangement that biases the turning axis in one direction parallel to the turning axis to thereby cause the sliding contact member to contact the support section.

2. The mirror actuator according to claim 1, wherein the biasing arrangement has a magnetic force generating section that biases the turning axis by a magnetic force to cause the sliding contact member to contact the support section.

3. The mirror actuator according to claim 2, comprising:
   a coil that is arranged on a moving section for holding the mirror; and
   a magnet that is arranged on abase and applies a magnetic field to the coil, wherein
   the biasing arrangement has the magnet and a magnetic member that is arranged on the moving section and generates the magnetic force in the direction of biasing between the biasing arrangement and the magnet.

4. The mirror actuator according to claim 3, wherein the magnetic member is arranged on the turning axis.

5. The mirror actuator according to claim 4, wherein the magnetic member constitutes a stopper member that is arranged on the turning axis and is formed by a magnetic material.

6. The mirror actuator according to claim 2, comprising:
   a shaft bearing that is included in the support section and is formed by a magnetic member; and
   a magnet that is attached to the turning axis and generates a magnetic force between the magnet and the shaft bearing, wherein
   the biasing arrangement has the magnet and the shaft bearing.

7. The mirror actuator according to claim 6, further comprising:
   a stopper member that is arranged on the turning axis and is formed by a magnetic material to be stuck by the magnet.

8. The mirror actuator according to claim 1, wherein the sliding contact member includes a buffer member that is elastically changeable in a direction parallel to the turning axis.

9. A beam irradiation device, comprising:
   a mirror actuator for driving a mirror; and
   a laser light source for supplying laser light to the mirror, wherein
   the mirror actuator includes:
   a turning axis for turning a mirror;
   a support section for supporting the turning axis so as to be capable of turning;
   a sliding contact member that is arranged on the turning axis and is opposed to the support section in a direction parallel to the turning axis with a predetermined clearance from the support section; and
   a biasing arrangement that biases the turning axis in one direction parallel to the turning axis to thereby cause the sliding contact member to contact the support section.

10. The beam irradiation device according to claim 9, wherein the biasing arrangement has a magnetic force generating section that biases the turning axis by a magnetic force to cause the sliding contact member to contact the support section.

11. The beam irradiation device according to claim 10, comprising:

a coil that is arranged on a moving section for holding the mirror; and a magnet that is arranged on a base and applies a magnetic field to the coil, wherein the biasing arrangement has the magnet and a magnetic member that is arranged on the moving section and generates the magnetic force in the direction of biasing between the biasing arrangement and the magnet.

12. The beam irradiation device according to claim 11, wherein the magnetic member is arranged on the turning axis.

13. The beam irradiation device according to claim 12, wherein the magnetic member constitutes a stopper member that is arranged on the turning axis and is formed by a magnetic material.

14. The beam irradiation device according to claim 10, comprising:

a shaft bearing that is included in the support section and is formed by a magnetic member; and a magnet that is attached to the turning axis and generates a magnetic force between the magnet and the shaft bearing, wherein the biasing arrangement has the magnet and the shaft bearing.

15. The beam irradiation device according to claim 14, further comprising:

a stopper member that is arranged on the turning axis and is formed by a magnetic material to be stuck by the magnet.

16. The beam irradiation device according to claim 9, wherein the sliding contact member includes a buffer member that is elastically changeable in a direction parallel to the turning axis.

* * * * *